May 17, 1932.　　　　J. ANDRE　　　　1,858,384
PENDULUM APPARATUS
Filed May 7, 1929　　　3 Sheets-Sheet 3
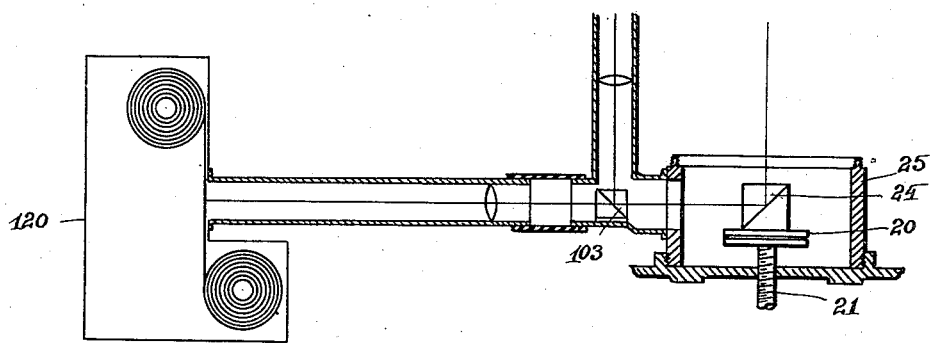
FIG. 13.
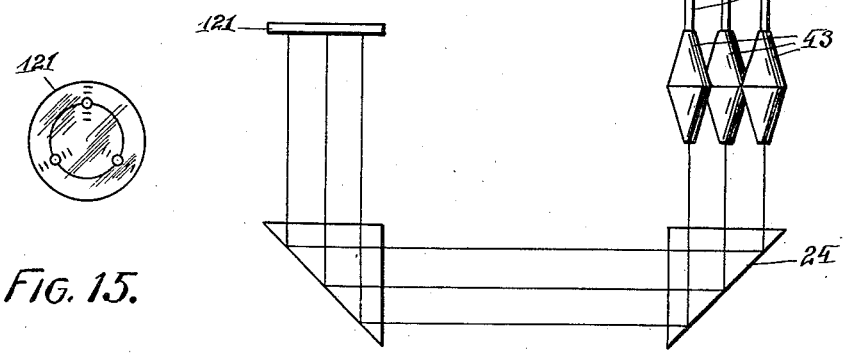
FIG. 15.
FIG. 14.
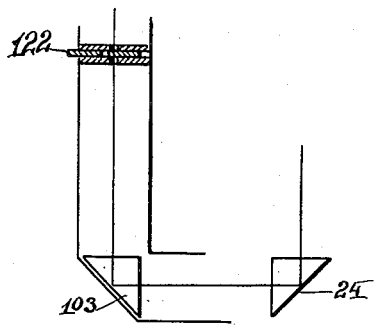
FIG. 16.
Inventor
JOSEF ANDRE
By
*Eric E Schinger,* Attorney Patented May 17, 1932

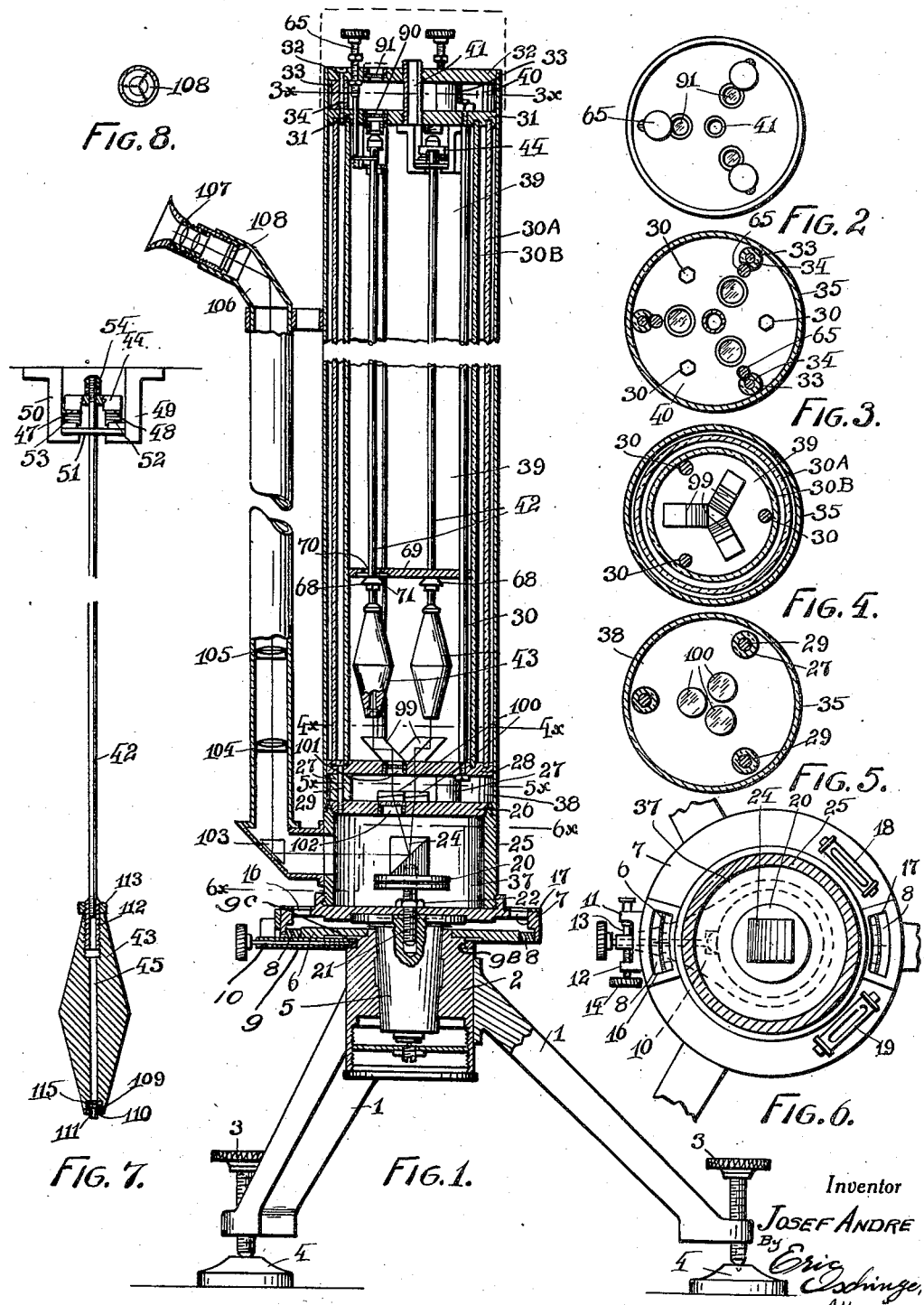

1,858,384

UNITED STATES PATENT OFFICE

JOSEF ANDRE, OF ROCHESTER, NEW YORK

PENDULUM APPARATUS

Application filed May 7, 1929. Serial No. 361,243.

This invention relates to methods of determining the contour of subterranean strata or boundaries of geologic formations and has for its object to study the geological conditions at depths that cannot be conveniently and economically reached by ordinary means. By the use of the invention it is possible to determine accurately the location of deposits of mineral oils, various ores or other valuable materials and the extent of the boundaries of such deposits. The invention is incorporated in the form of a pendulum apparatus employing one or more pendulums which are constructed and mounted in a novel manner so that their swinging movements may be minutely observed and accurately measured and the necessary computations from the observations and measurements made more accurately and in a far shorter time than has heretofore been possible with pendulum apparatus.

All these and other objects of the invention will be apparent from the accompanying drawings, the specification and the appended claims forming a part thereof.

In the accompanying drawings:

Figure 1 is a longitudinal sectional view of the apparatus.

Figure 2 is a top plan view of the apparatus.

Figure 3 is a horizontal sectional view taken on the line 3x—3x of Figure 1.

Figure 4 is a horizontal sectional view taken on the line 4x—4x of Figure 1.

Figure 5 is a horizontal sectional view taken on the line 5x—5x of Figure 1.

Figure 6 is a horizontal sectional view taken on the line 6x—6x of Figure 1.

Figure 7 is a partial sectional view and elevation of one of the pendulums and its mounting.

Figure 8 is a plane view of the glass scale or measuring field on which the movements of the pendulum are observed and measured.

Figure 13 is a diagrammatic view illustrating how the movements of the pendulum of the apparatus may be simultaneously observed and photographically recorded.

Figure 14 is a diagrammatic view of a modified optical system for observing the movements of the pendulum.

Figure 15 is a plane view of the glass scale or measuring field on which the movements of the pendulums of the modified method illustrated in Figure 14 are observed.

Figure 16 is a diagrammatic view of a portion of the optical system illustrating the use of a movable time controlled shutter in connection therewith.

In the several figures of the drawings like reference numerals indicate like parts.

Figure 9:
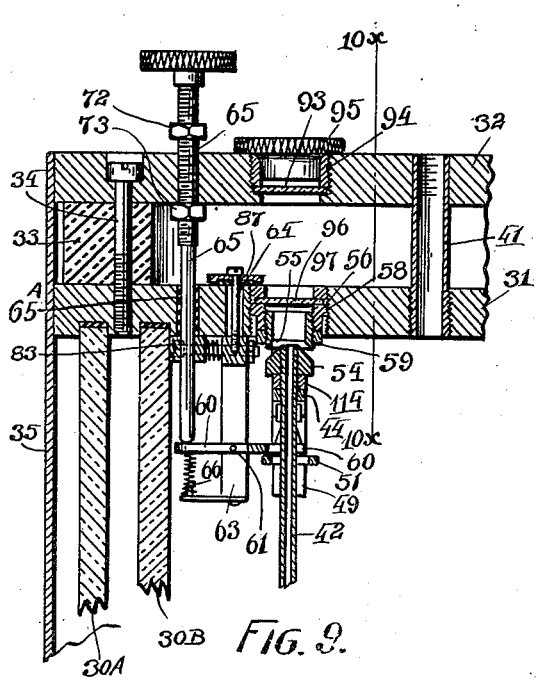
Figure 9 is an enlarged vertical sectional view of a portion of the upper end of the apparatus illustrating the mounting of one of the pendulums, the section being located on the line 9x—9x of Figure 10.
Figure 10:
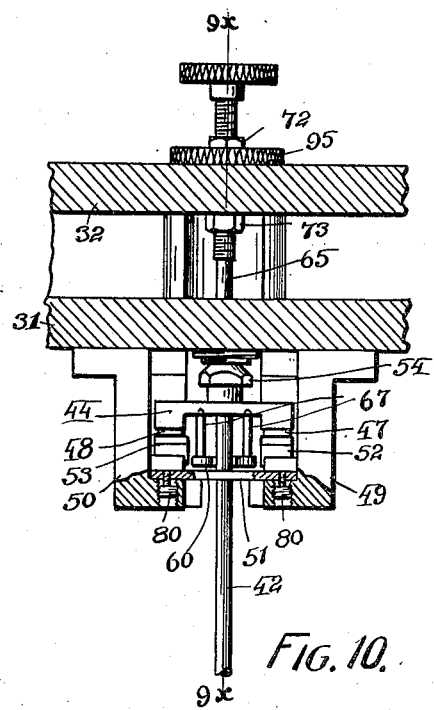
Figure 10 is a view of the parts illustrated in Figure 9 with the section taken on the line 10x—10x of Figure 9.
Figure 11:
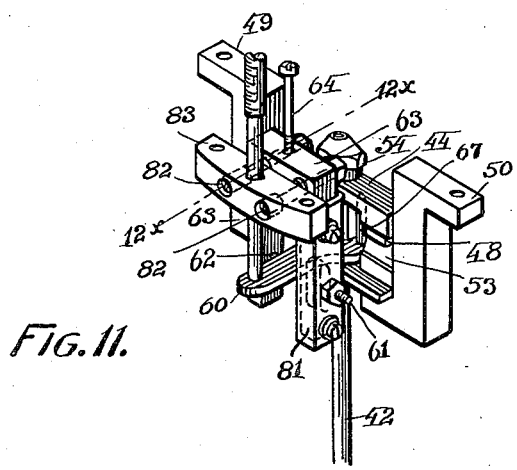
Figure 11 is a detail perspective view of the mounting of one of the pendulums.
Figure 12:
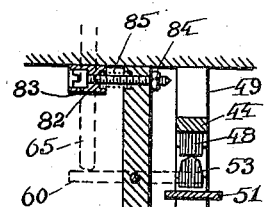
Figure 12 is a vertical sectional view of the mounting of a pendulum, the section being taken on the line 12x—12x of Figure 11.

As illustrated in Figure 1 the apparatus is supported by the legs 1, 1 preferably three in number which are spaced 120 degrees and are arranged in the form of a tripod. The upper ends of the legs 1 are suitably fastened to the supporting head 2 by which the apparatus is supported and on which it may be rotated for a purpose that will hereinafter be described. All of the legs 1, 1 are provided with a leveling screw 3 which rests in the leveling shoes 4 to allow the apparatus to be accurately leveled before making measurements therewith. In the head 2 is mounted the conical center 5 which forms the pivot on which the apparatus is rotated. The horizontal limb 6 is concentrically attached to the supporting head 2 and is stationary therewith. Mounted on top of the conical center is the circular level plate 7 which overhangs the horizontal limb 6 and carries on the under side the nonius 8 which encircles the horizontal limb. Also mounted on the supporting head 2 but below the horizontal limb 6 is the vernier clamp 9. This clamp comprises an arm 9A having a vertical bearing 9B at one end of it by means of which the clamp is mounted to rotate on the center 5. A gib 9C is provided in the periphery of the bearing in the clamp and this gib is adapted to be forced against the center by means of the clamping screw 10 so that the vernier clamp can be firmly fastened to the center and held stationary thereon.

The outer end of the arm forming the vernier clamp projects between the lugs 11 and 12 which are carried on the periphery of the level plate. Lug 11 has the spring pressed stud 13 mounted therein and its yielding force is applied against one side of the arm of the vernier clamp. The vernier screw 14 is threaded in the other lug 12 and its end can be screwed against the opposite side of the arm and move the arm in one direction against the pressure of the spring pressed stud or allow the spring pressed stud to move the arm in the opposite direction when turing the screw to move its end in a direction away from the side of the arm of the vernier clamp. In this way the vernier clamp may be used to turn the level plate by releasing it from the center and turning it until the level plate has been approximately placed in the desired position when the clamping screw is turned to clamp the vernier clamp to the center and hold it stationary therein while the final vernier adjustment is made by turning the vernier screw 14 in either one or the other direction to rotate the level plate until the nonius has been properly adjusted on the horizontal limb for the final vernier setting of the apparatus in the horizontal plane. The graduations of the horizontal limb and the nonius are observed thru the sight openings 16 and 17 located at diametrically opposite points near the periphery of the level plate.

The vertical adjustment of the apparatus is made by means of the pair of plate levels 18 and 19 located one on each side of the sight opening 17. These levels are adjusted by means of the leveling screws 3, 3 carried by the legs 1 of the apparatus and resting in the leveling shoes 4 as above described.

Centrally mounted in the level plate 7 is the prism table 20. This table is supported on a central threaded stud 21 which is threaded into the top of the conical center. The prism table may be adjusted vertically by threading the stud up or down in the conical center 5 and then clamping the stud and the table in the adjusted position by means of the locknut 22. The prism 24 is mounted on the prism table and is fixed thereon by means of a suitable clamp which holds the prism fixed in the proper angular position.

The prism table and the prism supported thereon are surrounded by the cylindrical shell or casing 25. The bottom of this casing is preferably threaded to the top of the level plate 7 and forms a hollow vertical extension thereon. The top of the casing 25 is closed by the plate 26 which is threaded into it to be firmly held in place therein. Supported above the plate 26 and spaced from it by suitable insulating blocks 27, 27 is the supporting plate 28. Studs 29, 29 preferably three in number, pass thru the supporting plate and the insulating blocks 27 and are threaded into the plate 26 to anchor the supporting plate on top of the housing surrounding the prism and prism table. Anchored in the supporting plate 28 and projecting upwardly therefrom are provided the tie rods 30, 30 also preferably three in number. These rods are threaded at each end and the lower threaded ends project thru the supporting plate 28 and have a locknut threaded thereon by means of which the ends of the rods are firmly clamped in place in the supporting plate 28. The upper ends of the tie rods 30 project thru the cover plate 31 and are similarly anchored therein to support the cover plate the proper elevation above the supporting plate.

In both the supporting plate and the cover plate are provided a pair of concentric grooves into which extend the bottom and top of the glass cylinders 30A and 30B. These concentric glass cylinders are located on the outside of the tie rods 30 and both ends are sealed air tight in the supporting plate and cover plate by means of a suitable packing that is placed into the concentric grooves between the bottom of the grooves and the ends of the glass cylinders. The tie rods 30 which support the cover plate also clamp the ends of the glass cylinders in place in the concentric grooves of these plates and the packing provided therein.

Mounted on top of the cover plate 31 and suitably spaced from it is the auxiliary cover plate 32. Insulating blocks 33, similar to those employed between the plates 26 and 28, space the auxiliary cover plate 32 from the cover plate 31. The insulating blocks 33 are fastened to the plates 31 and 33 by means of the studs 34 which pass thru the auxiliary cover plate and the blocks 33 and are threaded into the cover plate 31. Plates 26, 28, 31, 32 and the spaces between them are encased by the cylindrical metal casing 35 which is threaded at the bottom on the inside thereof and is screwed over the upper end of the casing 25 to form a continuation thereof.

Four cylindrical chambers are thus formed on top of the level plate. The lowermost of these indicated by reference numeral 37 encloses the prism table and the prism mounted thereon. The next chamber is a heat insulating chamber indicated by reference numeral 38 and serves to insulate the bottom of the pendulum chamber 39, which is located above it, from the influence of varying temperature conditions surrounding the apparatus. The fourth chamber, indicated by reference numeral 40, is located above the pendulum chamber and is identical to the insulating chamber 38 and protects the top of the pendulum chamber from the varying temperature conditions surrounding the apparatus. The pendulum chamber 39 is insulated against the influence of the changes in temperature by the pair of concentric glass cylinders 30A and 30B and the sealed air space between these two cylinders as well as the air space between the cylindrical metal casing 35 and the outer one of the glass cylinders. The pendulum chamber is, as pointed out above, made air tight by the mounting of the glass cylinders between suitable packing in the supporting plate and the cover plate. This makes it possible to have the air exhausted from the pendulum chamber thru the tube 41 leading from the inside of the pendulum chamber thru the center of the cover plate 31 and the auxiliary cover plate 32. A suitable valve mechanism, not shown, is of course necessary and is used in order to close the tube after the air has been exhausted from the pendulum chamber.

Within the pendulum chamber are mounted the pendulums 42, 42, preferably three in number. These pendulums are astronomically correct in length and each comprises a pendulum body or bob 43 in the form of two truncated conical members which taper from the middle of the bob in both directions. Into the top of each pendulum body or bob is threaded a hollow or tubular pendulum rod, the upper free end of which carries the pendulum head 44. The pendulum body or bob 43 is provided with a central duct 45 which forms a continuation of the hollow center of the pendulum rod so that light rays may pass unobstructed thru the pendulum for a purpose that will presently appear.

The head 44 of the pendulum projects radially in two diametrically opposite directions from the pendulum rod and on the under side of the head are mounted the planes 47 and 48 made of agate and optically perfect in the bearing surfaces and the alignment with each other.

Each pendulum head is adapted to be supported in a saddle made up of a pair of brackets 49 and 50. These brackets are fastened to the under side of the cover plate 31 and project downwardly and inwardly with a suitable space left between the inwardly projecting lower ends. On the inwardly projecting ends of these brackets is supported the knife edge mounting plate 51 which has an opening in the center thru which the pendulum rod projects and in which it can swing. On the mounting plate 51 are mounted a pair of knife edges 52 and 53, one on each side of the pendulum rod and opposite to the planes 47 and 48 of the pendulum head. The knife edges 52 and 53 are also made of agate and are ground optically perfect and lined up with each other and the planes of the pendulum head to provide a practically frictionless bearing for the pendulum to swing thereon.

On the upper end of the pendulum rod above the head 44 is provided a sleeve 54 which surrounds the end of the rod and has its upper end tapered so that it may seat itself in the correspondingly tapered seat 55 provided in the sleeve 56 when moved in engagement therewith. The sleeve 56 is adjustable in and out of another sleeve 58 which is threaded into an opening in the cover plate 31. A lock nut 59 is threaded to the outside of the sleeve 56 and is threaded against the end of the sleeve 58 when the proper position of the sleeve 56 in the sleeve 58 has been found in order to lock the sleeve 56 in this position.

The conical end of the pendulum rod above described is lifted into engagement with the seat in the sleeve in order to separate the agate planes and knife edges when the instrument is not in use and thus relieve the knife edges from the weight of the pendulum and keep the pendulum fixed. The lifting of the pendulum to separate the planes of the head from the knife edges of the pendulum support is done by means of the lifting lever 60 which is mounted to rock between laterally adjustable trunnion pins 61 and 62. These trunnion pins are mounted in an inverted U shaped bracket 63 which in turn is adjustably clamped to the under side of the cover plate 31 by means of the clamping screw 64. The lifting lever 60 is operated by means of the adjusting screw 65. This screw is threaded into the auxiliary cover plate 32 and by turning it is moved up and down therein. The lower portion of the adjusting screw is smooth and projects thru air tight bushing or stuffing box 65A provided in the cover plate 31. From the cover plate 31 the end of the adjusting screw extends down into engagement with the top surface of the outer end of the lifting lever 60. Between the bottom of the lifting lever and a suitable bracket projecting to one side of the bottom of the bracket 63 is an expansion spring 66 which normally forces the outer end of the lifting lever against the lower end of the adjusting screw 65. The inner end of the lifting lever 60 is bifurcated and partially encircles the pendulum rod below the head 44 thereof. A pair of pointed upwardly projecting pins 67 are mounted on the bifurcated end of the lifting lever one on each side of the pendulum rod and these pins are adapted to engage into conical sockets provided in the under side of the head 44 of the pendulum. This takes place when the adjusting screw 65 is turned to move its end down onto the lifting lever and rock the lever so that its bifurcated end is raised and with it the pins 67 carried thereby. As the pins 67 are raised, they engage the sockets in the pendulum head and lift the head and in so doing disengage the planes 47 and 48 of the pendulum head 44 from the knife edges 52 and 53 of the pendulum support. The head of the pendulum is raised until the conical upper end 54 thereof is seated in the fixed conical seat 55 of the sleeve 56. When this is done the head of the pendulum is held fixed between the lifting lever and the cover plate and at the same time is disengaged from the pendulum support.

In order to hold the lower end of the pendulum fixed at the same time the upper end is held fixed, as above described, so as to prevent the bending of the pendulum rod, the pendulum is provided with the cone shaped collar 68 which is suitably fastened to the pendulum rod a short distance from the pendulum body. In addition a centering plate 69 is supported between the tie rods 30 at a suitable distance above the collars on the pendulum rods. An opening 70 is provided for each pendulum in this centering plate thru which the pendiulum rod can pass and in which it can swing. In the bottom of the centering plate surrounding the openings therein are provided the cone shaped seats 71 which correspond to conical collars and when the pendulum is raised, as above pointed out to seat the upper conical end thereof in a sleeve in the cover plate, the conical collar 68 at the same time seats itself in the seat 71 in the centering plate thereby holding the pendulum stationary and fixed at both ends. The adjusting screw 65 is provided with the nuts 72 and 73, one above and the other below the auxiliary cover plate 32, and these nuts are spaced so as to allow only a limited movement of the adjusting screw which will be sufficient to raise the pendulum and hold it fixed between the seats provided for it and no more. A pressure that may stretch the pendulum can therefore not be applied to the pendulum as the adjusting screw will raise the lifting lever only to a point where the pendulum is held fixed in the seats provided for it.

On the release of the pendulum for the purpose of seating it on its support, the adjusting screw is turned to allow the outer end of the lifting lever to rise, which movement of the lever is caused by the pressure of the expansion spring 66 which forces the lifting lever upwardly as the end of the adjusting screw is moved upwardly in a direction away from the lifting lever. The adjusting screw is turned until the expansion spring has rocked the lifting lever into a position in which the pins 67 are disengaged from the sockets in the pendulum head and have allowed the agate planes of the pendulum head to rest on the agate knife edges of the pendulum support. The pendulum, when thus released, is free to swing for the purpose of making observations and measurements. The lifting lever may thus be manipulated from the outside of the apparatus by turning the adjusting screw 56, and the pendulum is lowered gently to prevent injury to the knife edges or planes. The pins on the lifting lever insure that the pendulum will come down on the knife edges in exactly the correct position and that this position will never be altered no matter how often the pendulum is raised and lowered.

For the purpose of accurately placing the pendulum in the proper position various adjustments in the pendulum support and the suspension of the pendulum head by the lifting lever are provided. The first of these adjustments are in the support itself which is provided with suitable screws 80, 80 by means of which the knife edge supporting plate 51 may be raised, lowered and leveled in order to properly set the knife edges in a horizontal plane within the support.

The adjustment of the lifting lever mounting is manifold in order to hold and place the pendulum head in the proper position with relation to the knife edges. As above described, the trunnion pins 61 and 62 on which the lifting lever 60 rocks, are adjustable laterally in the bracket 63 and this adjustment allows a lateral adjustment of the pendulum head in a direction that is parallel with the knife edges. One side of the supporting bracket 63 is provided with a sliding member 81 and this member may be raised and lowered on the bracket 63 for the purpose of raising and lowering the trunnion pin 61, which is carried by it in order to adjust the lifting lever 60 and with it the pendulum head in a vertical plane. A lateral adjustment of the lifting lever at right angles to the knife edges is secured by the adjustment of the bracket 63 toward or away from the pendulum support. This is made possible by the mounting of the bracket 63 with one screw in an elongated hole in the cover plate 31, so that by the turning of the adjusting screws 82 in the lug 83 the bracket may be moved toward or away from the pendulum support. The lug 83 in which the adjusting screws 82 are threaded is located in front of the bracket 63 and the screws extend thru the bracket 63 with a nut 84 located on the outer end so that the spring 85 which surrounds each adjusting screw can force the bracket away from the lug against the nut and thus allow the bracket to be moved forward or backward on the rotation of the adjusting screw. In order to seal the elongated opening in the supporting head 31 thru which the clamping screw 64 passes to clamp the bracket 63 in place on the under side of the supporting plate, a sealing washer 87 is located between the head of the clamping screw 64 and the top of the supporting plate surrounding the elongated opening provided therein. The under side of this washer has a rubber or other suitable lining which when drawn down onto the supporting plate will seal the elongated opening around the shank of the clamping screw 63. Without such a sealing washer the inside of the pendulum chamber could not be exhausted for the purpose of having the pendulum swing in a vacuum.

Plates 26, 28, 31 and 32 are all provided with sight openings or closed with plano glass plates or windows thru which the light rays are admitted into the hollow pendulums and the optical system which will hereinafter be described. There are as many openings in each plate as are pendulums used in the apparatus and the openings 90 and 91 provided in the plates 31 and 32 respectively in the top of the apparatus are in line with each other and the hollow pendulums over which they are located. Each of the openings is closed with a plano parallel glass window which is suitably held in place in the opening. As illustrated in Figure 9 the plano parallel window 93 in the opening 91 rests on a shoulder provided in the opening and is firmly held in place therein by means of the locking ring 94 which is threaded into the opening on top of the plano parallel window. For the purpose of closing one or all of the openings 91 in the plate 32 a plug 95 may be inserted into the locking ring to completely shut out the light from one or more of the pendulums.

The openings 90 provided in the plate 31 have their plano parallel windows 96 held in place between the top of the threaded sleeve 58 and a locking ring 97 threaded on top of the window. Light rays can thus pass unobstructed from the top of the apparatus thru the plano parallel windows in the openings in the plates into the hollow pendulum rods and the pendulum bobs suspended from them.

The openings in the plates 26 and 28 located below the pendulum chamber are arranged closer to the center of the apparatus and the light rays after leaving the pendulum are deflected thru these openings by a combination of prisms 99, 99 and optical achromatic wedges 100, 100. The prisms 99 are located within the pendulum chamber and are supported by suitable holders above the openings 101 provided in the plate 28. The prisms have two parallel reflecting surfaces which project at an angle of 45 degrees from the surface on which they are mounted and held in line with the openings 101. The prisms are mounted so as to deflect the light rays from the pendulum thru the openings 101 into the achromatic wedges 100 which have an angle of approximately 3 degrees by which the light rays are again deflected, this time angularly, thru the openings 102 provided in the plate 26. The angle with which the light rays are deflected is adjusted by placing the wedges 100 in such relation to each other that the light rays from all of the pendulums when stationary or fixed meet in the focus of a microscopic optical system.

For this purpose the light rays of all of the pendulums are deflected by the prism 24 thru an opening in the prism chamber into the prism 103 and from there to the focus of the microscopic optical system consisting of the achromatic lenses 104, 105, prism 106 and the eye piece 107. Between the eye piece 107, which is adjustable, and the prism 106, is located the measuring field 108 on which suitable graduations are provided for the purpose of measuring the movements of the pendulums as indicated by the images of the light rays from the pendulums on the measuring field. The measuring field 108 is adjustable in and out to provide for a proper adjustment of this field in the focal plane of the microscopic system. The eye piece 107 is also adjustable and is interchangeable as well so that eye pieces of high or low magnifying power may be used. An eye piece of high magnifying power may be used in the system while the pendulums are adjusted as the higher magnifying power will more clearly show whether or not the light rays passing thru the pendulums will be in focus with the optical system. An eye piece having a lower magnifying power however is desirable when making observations and taking readings because the movements of the pendulums will not be magnified to a point where their observations and measurements will be difficult due to the vibrative motions of the pendulums.

The combination of the prisms 99 and the optical achromatic wedges, as above pointed out, deflect all of the light rays passing thru the pendulums into a common point located in the focal plane of the microscopic system. Furthermore the combination of the prisms and the wedges prevent stigmatism in the optical system so that the images of the light rays of the pendulums as observed in the measuring field will be sharp and clear.

In the open end of each pendulum bob is mounted a diaphragm 115 and a colored light filter 109. The color of the filter is different in each pendulum in order to distinguish the light rays passing thru the different pendulums and identify the light ray with the particular pendulum thru which it has entered the optical system. The difference in the length of the waves of the light rays of different color filters 109 is compensated for by an adjustment of the optical wedges 100. Each colored filter 109 is located in a sleeve 110 having an opening in the top thru which the light rays pass from the pendulum bob into the filter. The sleeve 110 is threaded into an enlarged opening in the bottom of the pendulum bob and the filter is held in place therein by a locking ring 111 threaded into the inside of the sleeve against the filter as illustrated in Figure 7. A diaphragm 115 is located above the color filter and restricts the opening in the pendulum in order to give the light image produced by the light rays and the colored filter a sharp outline when observed on the measuring field 108 by means of the microscopic system.

The apparatus is set up by placing it in a perfectly vertical and horizontal position with the means provided on the apparatus for adjusting it until this position has been found. When in this position the image of the light rays of all of the pendulums must meet in the focal plane of the microscope, and the optical wedges 100 are adjusted with relation to each other until the light rays from all of the pendulums are deflected by them into the focal plane of the microscope and can be observed in this position in the measuring field 108.

As heretofore mentioned, each pendulum is of accurate astronomical length and is preferably a second pendulum although a shorter or longer pendulum may be used if the apparatus is correspondingly made smaller or larger. Each pendulum rod is adjustable both in the pendulum head and pendulum bob until the correct length is found. In the pendulum bob is provided for this purpose a threaded sleeve 112 which is locked to the pendulum bob by means of the lock nut 113. The end of the pendulum rod is threaded into the sleeve 112 and thus held in place therein. The upper end of the pendulum rod is threaded into the head 44 and locked thereto by means of the lock nut 114 so that the head of the pendulum may also be adjusted at the upper end of the rod in order to get the absolute correct astronomical length of the pendulum.

The microscopic optical system illustrated in Figure 1 in connection with the apparatus is suitable for personal observation only. Three pendulums are provided and the swinging movements may be observed collectively or singly by keeping either, all or but one or two of the openings 91 in the top of the apparatus uncovered by means of the plugs 95. When it is also desired to photographically record the movements of the pendulum an auxiliary recording apparatus 120 is attached to the pendulum apparatus in line with the prisms 24 and 103. Prism 103 is then 25 percent silvered and the rear of the mounting of the prism left open so that 75 percent of the light rays from the prism 24 will pass thru the prism to the photographic recording apparatus to be recorded, while the other 25 percent of the light rays may be observed thru the eye piece on the measuring field in the manner heretofore described. But one or a series of pendulum apparatus may be used at different stations and the movements of the pendulums recorded automatically and also observed personally from time to time while the recording is taking place.

The film of the photographic recording apparatus 120 may be an achromatic film which is sensitive to the different colors of the images of the light rays passing thru the pendulums. In this way the record of each pendulum in the apparatus will be distinguishable from the other just as the images are distinguishable when observed thru the eye piece. Of course the ordinary photographic film may be used in place of the achromatic film.

The swinging movements of the pendulums may also be compared with the movements of a shutter operated by a chronometer. Such a shutter 122, which may be of any suitable design, may be inserted into the optical system or the photographic apparatus and operated by a chronometer (not shown) to compare the time of the swinging movements of the pendulums with the time as given by the chronometer.

In Figure 14 I have diagrammatically illustrated a method of observing the movements of the pendulums without the use of the combined prism and optical wedge system illustrated in Figure 1. In this method the light rays passing thru the hollow pendulum are observed in their various positions on the measuring field 121. The light rays instead of meeting in the center of this measuring field are visible in individual positions and their swinging movements are observed as swinging in their individual positions and not from a central meeting point as is the case in the optical system described in connection with Figure 1.

There are several features of my apparatus that make for accuracy in the observation and measurements that are made with it. First of all is the method which permits the use of light rays for the observations and measurements of the swinging movements of the pendulum. The light rays are constant and are obtainable both during the day and at night for the use of the apparatus. Furthermore the light rays do not influence the pendulum. A lengthening or shortening of one or more of the pendulums is instantaneously observed because in lengthening or shortening one of the hollow pendulums, the image of the light rays from the pendulum is thrown out of focus with the optical system which is quickly detected by those making observations and measurements with the apparatus. Observations and measurements which are not accurate are thus avoided because the apparatus will not be used unless the measurements to be taken are sure to be correct.

The influences of varying temperatures, which may cause shortening or lengthening of the pendulums, are guarded against by the use of the insulating chambers at the bottom and top of the pendulum chamber and the insulating chamber surrounding the pendulum chamber by the use of two concentric glass cylinders and one metallic cylinder with air spaces between them. In addition the construction of the apparatus permits the exhausting of the pendulum chamber thereby allowing the pendulums to swing in a vacuum with the least possible interference.

The use of one or a plurality of pendulums at will for observations and measurements gives the apparatus a further distinction and advantage over other remotely similar apparatus. The apparatus is illustrated with three pendulums but of course this may be increased to a larger number of pendulums or decreased to but two or even one pendulum.

I claim:

1. A pendulum apparatus comprising a hollow pendulum adapted to have light rays pass therethru from one end to the other thereof, a fixed light source near one end of said hollow pendulum and spaced from it, means for supporting said pendulum to permit a free oscillation thereof and allow light from said fixed light source to fall into and pass thru said pendulum during the oscillation thereof, and means for observing the movement of the light rays passing thru said pendulum during the oscillation thereof.

2. A pendulum apparatus comprising a pendulum, means provided on said pendulum for directing light rays parallel to the pendulum the full length thereof, a fixed light source spaced from said light directing means and adapted to have light rays therefrom fall onto said light directing means, means for supporting said pendulum to permit a free oscillation of said pendulum and means for observing the oscillating image of the light rays at the free end of the pendulum.

3. A pendulum apparatus comprising a hollow pendulum, a vacuum chamber surrounding said pendulum, supporting means provided in said vacuum chamber to permit a free oscillation of said pendulum within said vacuum chamber, an insulating chamber surrounding the sides, top and bottom of said vacuum chamber and means permitting light rays to enter said vacuum chamber thru said insulating chamber into said hollow pendulum at the top thereof and permitting the light rays to leave said vacuum chamber after passing thru said pendulum thru the bottom thereof.

4. A pendulum apparatus comprising a hollow pendulum, means for supporting said pendulum to permit a free oscillation of said pendulum, a diaphragm carried at the lower end of said pendulum, a light filter located below said diaphragm, and means for observing the image of the light rays passing thru said pendulum, its diaphragm and light filter.

5. A pendulum apparatus comprising a hollow pendulum, means for supporting said pendulum to permit a free oscillation of said pendulum, a diaphragm carried at the lower end of said pendulum, and means for observing the image of the light rays passing thru said diaphragm.

6. A pendulum apparatus having a pendulum comprising a pendulum rod having a hollow center, a pendulum bob having a hollow center at the lower end of said hollow rod and forming a continuation thereof, means for adjusting said hollow rod in and out of said pendulum bob to make the length of said pendulum and its continuous hollow center mathematically correct, and means for supporting said pendulum to permit a free oscillation of said pendulum.

7. A pendulum apparatus comprising a chamber, a plurality of hollow pendulums mounted to freely oscillate in said chamber, means for admitting light rays into said chamber and thru said hollow pendulums, and means for directing the light rays passing thru said pendulums into a common focus after leaving said pendulums.

8. A pendulum apparatus comprising a hollow pendulum, a pendulum head at the upper end of said pendulum, a support for supporting said pendulum head to permit a free oscillation of said pendulum, means for raising and lowering said pendulum head from said support, means at a point above said pendulum and at a point intermediate of said pendulum adapted to enage said pendulum when raised from its support and hold said pendulum rigid the full length thereof in the raised position, means for directing light rays thru said hollow pendulum, and means for observing the light rays passing thru said hollow pendulum.

9. In a pendulum apparatus comprising a plurality of hollow pendulums adapted to freely oscillate in a pendulum chamber, the combination of a series of prisms located below said pendulums to deflect the light rays from said pendulums radially toward a common center into a series of optical wedges, said optical wedges deflecting said light rays toward a common focus and means for observing the movements of the light rays from this common focus on the oscillation of said pendulums.

10. In a pendulum apparatus comprising a plurality of hollow pendulums adapted to freely oscillate in a pendulum chamber, the combination of a series of prisms, one below each of said pendulums, a corresponding series of optical wedges below said prisms, said prisms and optical wedges operating to deflect the light rays passing thru said pendulums to a common focus, a measuring field in said focus, and a microscopic optical system adapted to enlarge the image of the light rays in said measuring field.

11. In a pendulum apparatus comprising a plurality of hollow pendulums adapted to freely oscillate in a vacuum chamber, a heat insulating chamber at the top and bottom of said chamber and surrounding the sides thereof, means for admitting light rays thru the insulating chamber at the top into said pendulum chamber and the hollow pendulums mounted therein, and means permitting the light rays to pass from the end of the pendulums out of said pendulum chamber thru the insulating chamber at the bottom thereof, and optical means for deflecting the light rays passing thru all of said pendulums into a common focal center, a measuring field in said focal center and means for enlarging the image of said light rays on said measuring field.

12. In a pendulum apparatus comprising a plurality of hollow pendulums adapted to freely oscillate in a pendulum chamber, the combination of a light filter carried by each of said pendulums and adapted to have the light rays from the pendulums pass therethru, each of said light filters having a different color and an observation field on which the images of the differently colored light rays may be observed.

13. In a pendulum apparatus comprising a plurality of hollow pendulums adapted to freely oscillate in a pendulum chamber, the combination of an optical system for directing the light rays passing thru said hollow pendulums into a common focal center, recording means for simultaneously observing and recording the movements of the light rays passing thru said pendulums.

14. The method of measuring the movement of a pendulum on an observation field which consists in passing light rays from a fixed light source thru a hollow pendulum the full length thereof and observing the moving light rays on an observation field.

15. The method of measuring the movement of a plurality of pendulums on a common measuring field which consists in directing light rays by means of said pendulums parallel to said pendulums, and deflecting the light rays directed by said pendulums into a common focal center on said measuring field.

16. The method of measuring the movements of a plurality of pendulums on a common measuring field which consists in directing light rays by means of the pendulums parallel thereto and thru a color filter carried by each pendulum to product images of different color on said measuring field.

17. A pendulum apparatus comprising a pendulum chamber, a hollow pendulum mounted to freely oscillate in said chamber, a support for said pendulum chamber and means provided on said support for adjusting said pendulum chamber in a vertical and horizontal plane and means for directing light rays thru said hollow pendulum, means for observing the light rays passing thru said hollow pendulum.

18. A pendulum apparatus comprising a pendulum chamber, a hollow pendulum mounted to freely oscillate in said chamber, a support for said pendulum chamber and means provided on said support for adjusting said pendulum chamber in a vertical and horizontal plane, means for rotating said pendulum chamber in a horizontal plane on said support, means directing light rays thru said hollow pendulum and means for observing the light rays passing thru said pendulum.

19. A pendulum apparatus having a pendulum comprising a hollow pendulum bob made up in the form of a pair of truncated cones placed end to end with their center lines in line with each other and a hollow rod from which said bob is suspended in line with the center lines of said truncated cone shaped sections of said pendulum bob, means for passing light rays thru said hollow pendulum rod and hollow pendulum bob and means for observing the light rays passing thru the hollow pendulum rod and hollow pendulum bob.

20. In a pendulum apparatus the combination of a pendulum chamber comprising a supporting plate and a cover plate, spacing and supporting rods between said supporting plate and cover plate to hold said plates in parallel and vertical planes, hollow pendulums suspended from said cover plate to permit a free oscillation of said hollow pendulums between said parallel supporting plate and said cover plate, means for directing light rays thru said hollow pendulums and means for observing the light rays passing thru said hollow pendulums.

21. A pendulum apparatus having a pendulum comprising a pendulum rod having a hollow center, a pendulum bob having a hollow center carried at the lower end of said pendulum rod and forming a continuation of said hollow center of said pendulum rod, a pendulum head having a hollow center located at the top of said pendulum rod and forming a continuation of said hollow center of said pendulum rod, means for adjusting said head on said pendulum rod, and means for supporting said pendulum to permit a free oscillation thereof, a light source located above said pendulum head and separated from it and observing means at the bottom of said pendulum for observing the light rays passing thru said hollow pendulum head, hollow pendulum rod and hollow pendulum bob.

22. A pendulum having a hollow center adapted to have light rays pass therethrough from one end to the other thereof, means for supporting said pendulum to permit a free oscillation thereof, a fixed light field located above the suspended end of said pendulum but separated from it to have the suspended end of the pendulum oscillate in said light field, and means for observing the movement of the light rays passing thru said pendulum from said light field during the oscillation thereof.

23. A pendulum having a hollow center, a fixed light field, means for supporting said pendulum to permit a free oscillation of said pendulum below said light field to permit light rays to fall into the hollow center of said pendulum during the oscillation of said pendulum, and means for observing the oscillating image of the light rays below the free end of the pendulum.

24. A pendulum, a light passage thru said pendulum longitudinally thereof, means for adjusting the length of said pendulum and said light passage, means for suspending said pendulum to permit a freely swinging movement thereof and observing means for observing the light passing thru the light passsage of said pendulum.

25. A pendulum, a light passage thru said pendulum longitudinally thereof, an optical system in focus with the light rays passing thru said light passage, means for suspending said pendulum to permit a freely swinging movement thereof and observing means for observing the light passing thru the light passage of said pendulum.

In testimony whereof I affix my signature.

JOSEF ANDRE.